United States Patent
Rodriguez

(10) Patent No.: US 6,745,295 B2
(45) Date of Patent: Jun. 1, 2004

(54) DESIGNING A CACHE WITH ADAPTIVE RECONFIGURATION

(75) Inventor: Jorge R. Rodriguez, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 403 days.

(21) Appl. No.: 09/838,433

(22) Filed: Apr. 19, 2001

(65) Prior Publication Data

US 2002/0156980 A1 Oct. 24, 2002

(51) Int. Cl.[7] .............................. G06F 12/08
(52) U.S. Cl. .................... 711/136; 711/113; 711/132; 711/122
(58) Field of Search .................. 711/122, 129, 711/113, 134, 136, 132

(56) References Cited

U.S. PATENT DOCUMENTS

| | | | |
|---|---|---|---|
| 4,186,438 A | | 1/1980 | Benson et al. ............ 364/200 |
| 4,458,310 A | | 7/1984 | Chang .................... 364/200 |
| 4,463,424 A | | 7/1984 | Mattson et al. .......... 364/300 |
| 4,503,501 A | | 3/1985 | Coulson et al. .......... 364/300 |
| 5,043,885 A | | 8/1991 | Robinson ................. 364/200 |
| 5,357,623 A | * | 10/1994 | Megory-Cohen .......... 711/129 |
| 5,394,531 A | * | 2/1995 | Smith ..................... 711/136 |
| 5,537,635 A | * | 7/1996 | Douglas .................. 711/129 |
| 5,751,993 A | | 5/1998 | Ofek et al. .............. 395/463 |
| 5,822,562 A | | 10/1998 | Dahlen et al. ........ 395/497.01 |
| 5,892,937 A | | 4/1999 | Caccavale .............. 395/462 |
| 5,966,726 A | * | 10/1999 | Sokolov .................. 711/113 |

(List continued on next page.)

FOREIGN PATENT DOCUMENTS

| | | |
|---|---|---|
| JP | 11-39120 | 2/1999 |

OTHER PUBLICATIONS

Peter Buneman et al., "Proceedings of the 1993 ACM SIGMOD International Conference on Management of Data," SIGMOD Record, vol. 22, Issue 2, Jun. 1993, pp. 297–306.

J. Gecsei, D. R. Slutz, and I. L. Traiger, "Evaluation Techniques for Storage Hierarchies," IBM Systems Journal, No. 2, 1970, pp. 78–117.

R. Karedla, J. S. Love, B. G. Wherry, "Caching Strategies to Improve Disk System Performance," IEEE Computer, Mar. 1994, pp. 38–46.

E. J. O'Neil, P. E. O'Neil, and G. Weikum, "The LRU–K Page Replacement Algorithm for Database Disk Buffering," Proc. ACM SIGMOD Int'l Conf. On Management of Data, 1993, pp. 297–306.

J. T. Robinson and M. V. Devarakonda, "Data Cache Management Using Frequency–Based Replacement," Proc. Of ACM Conf. on Measurements and Modeling, 1990, pp. 134–142.

D. Thiebaut, H. S. Stone, J. L. Wolf, "Improving Disk Cache Hit–Ratios Through Cache Partitioning," IEEE Transactions on Computers, vol. 41, No. 6, Jun. 1992, pp. 665–676.

Primary Examiner—Hiep T. Nguyen
(74) Attorney, Agent, or Firm—Winstead Sechrist&Minick

(57) ABSTRACT

A system, computer program product and method for reconfiguring a cache. A cache array may be created with one or more stacks of cache entries based on a workload. The one or more stacks may be ordered from most frequently used to least frequently used. The cache entries in each particular stack may be ordered from most recently used to least recently used. When a cache hit occurs, the cache entry requested may be stored in the next higher level stack if the updated frequency count is associated with the next higher level stack. When a cache miss occurs, the cache entry in a least recently used stack position in the stack with the lowest number of cache hits in the one or more stack positions tracked during a particular period of time may be evicted thereby allowing the requested information to be stored in the lowest level stack.

48 Claims, 10 Drawing Sheets

U.S. PATENT DOCUMENTS

| | | | |
|---|---|---|---|
| 6,012,126 A | 1/2000 | Aggarwal et al. | 711/133 |
| 6,067,608 A | 5/2000 | Perry | 711/203 |
| 6,072,830 A | 6/2000 | Proctor et al. | 375/240 |
| 6,088,767 A * | 7/2000 | Dan et al. | 711/129 |
| 6,105,103 A | 8/2000 | Courtright, II et al. | 711/1 |
| 6,141,731 A * | 10/2000 | Beardsley et al. | 711/136 |
| 6,330,556 B1 * | 12/2001 | Chilimbi et al. | 707/2 |
| 6,370,619 B1 * | 4/2002 | Ho et al. | 711/129 |
| 6,378,043 B1 * | 4/2002 | Girkar et al. | 711/133 |
| 6,470,419 B2 * | 10/2002 | Take et al. | 711/113 |
| 6,493,800 B1 * | 12/2002 | Blumrich | 711/129 |
| 6,507,893 B2 * | 1/2003 | Dawkins et al. | 711/133 |
| 6,542,967 B1 * | 4/2003 | Major | 711/134 |

* cited by examiner

|  | $t_{n-4}$ | $t_{n-3}$ | $t_{n-2}$ | $t_{n-1}$ | $t_n$ |
|---|---|---|---|---|---|
| • • • | Window n-3 | Window n-2 | Window n-1 | Window n | |
| Stacks where a Cache hit occurred | ABCDD | AACB | ACDBA | DDCBAA | |
| Stack 601A hit count | 1 | 2 | 2 | 2 | |
| Stack 601B hit count | 1 | 1 | 1 | 1 | |
| Stack 601C hit count | 1 | 0 | 1 | 1 | |
| Stack 601D hit count | 2 | 0 | 1 | 2 | |

DESIGNING A CACHE WITH ADAPTIVE RECONFIGURATION

CROSS REFERENCE TO RELATED APPLICATION

The present invention is related to the following U.S. patent application which is incorporated herein by reference:

Ser. No. 09/838,607 entitled "Designing a Cache Using a Canonical LRU-LFU Array" filed Apr. 19, 2001.

TECHNICAL FIELD

The present invention relates to the field of cache design, and more particularly to designing a cache with adaptive reconfiguration thereby improving the performance of the cache.

BACKGROUND INFORMATION

A network server, e.g., file server, database server, web server, may be configured to receive a stream of requests from clients in a network system to read from or write to a disk, e.g., disk drive, in the network server. These requests may form what is commonly referred to as a "workload" for the network server. That is, a workload may refer to the requests that need to be serviced by the network server.

Typically, a server in a network system comprises a disk adapter that bridges the disk, e.g., disk drive, to the processing unit of the server unit. A server may further comprise a cache commonly referred to as a disk cache within the disk adapter to increase the speed of accessing data. A cache is faster than a disk and thereby allows data to be read at higher speeds. Thus, if data is stored in the cache it may be accessed at higher speeds than accessing the data on the disk.

There have been many methods in designing disk caches that seek to increase the cache hit rate thereby improving performance of the disk cache. A "cache hit" is said to occur if an item, e.g., data, requested by the processor in the server or a client in a network system, is present in the disk cache. When an item, e.g., data, requested by the processor in the server or a client in the network system, is not present in the cache, a "cache miss" is said to occur. A "cache hit rate" may refer to the rate at which cache hits occur. By improving the cache hit rate, the performance of the cache may be improved, i.e., less data needs to be serviced from the disk.

One method to improve the performance of a disk cache is commonly referred to as the Least Recently Used (LRU) replacement method as illustrated in FIG. 1. The LRU replacement method uses a single stack 101 comprising a set of cache entries where each cache entry stores particular data. As stated above, if an item, e.g., data, requested by the processor in the server or client in a network system is present in the cache, a "cache hit" is said to occur. When a cache hit occurs, the cache entry comprising the information, e.g., data, requested moves to the first stack position as illustrated in FIG. 1. As stated above, if an item, e.g., data, requested by the processor in the server or client in a network system is not present in the cache, a "cache miss" is said to occur. When a cache miss occurs, the requested item is retrieved from the disk and then stored in the first stack position as illustrated in FIG. 1. When a new entry is inserted in stack 101, the cache entry in the last stack position of stack 101 is evicted. The information, e.g., data, may subsequently be discarded.

Another method to improve the performance of a disk cache is commonly referred to as the Segmented LRU (S-LRU) replacement method as illustrated in FIG. 2. The S-LRU replacement method may use two stacks 201A–B. Each stack, stack 201A–B, may comprise a set of cache entries where each cache entry stores particular instructions and data. When a cache hit occurs in the first stack, e.g., stack 201A, the cache entry comprising the information, e.g., data, requested moves up to the first stack position of the second stack, e.g., stack 201B, as illustrated in FIG. 2. When a new entry is added to stack 201B, the cache entry at the last stack position of stack 201B is evicted to the first stack position of stack 201A. When a new entry is inserted in stack 201A, the cache entry at the last stack position of stack 201A is evicted. The information, e.g., data, may subsequently be discarded. When a cache hit occurs in the second stack, e.g., stack 201B, the cache entry comprising the information, e.g., data, requested moves up to the first stack position of that stack, e.g., stack 201B, as illustrated in FIG. 2. When a new entry is inserted in stack 201B, the cache entry at the last stack position of stack 201B is evicted to the first stack position of stack 201A. When a new entry is inserted in stack 201A, the cache entry at the last stack position of stack 201A is evicted. When a cache miss occurs, the requested item is retrieved from the disk and then stored in the first stack position of the first stack, e.g., stack 201A, as illustrated in FIG. 2. When a new entry is inserted in stack 201A, the cache entry at the last stack position of stack 201A is evicted. The information, e.g., data, may subsequently be discarded.

Unfortunately, these methods of cache design focus on static techniques instead of adaptive techniques. For example, the length of the stacks in these caches do not adapt, i.e., change in size, to changes in the request stream. Consequently, these methods do not efficiently use memory space since the cache is not designed based on adaptive techniques. If the memory space was efficiently used, then the cache hit rate may be improved.

It would therefore be desirable to develop a cache based on adaptive techniques thereby improving performance of the cache, i.e., improving the cache hit rate.

SUMMARY

The problems outlined above may at least in part be solved in some embodiments by designing a cache array reconfigurable based on tracking the changes in the request stream, i.e., workload.

In one embodiment of the present invention, a method for reconfiguring a cache may comprise the step of creating a cache array with one or more stacks of cache entries based on a workload. Each stack may be associated with a particular frequency count. That is, each cache entry in that particular stack has a frequency count of at least the frequency count associated with that particular stack. A frequency count may indicate the number of times the information, e.g., data, in the associated cache entry was requested. The one or more stacks in the cache array may then be ordered in an array from most frequently used to least frequently used based on the frequency counts associated with the one or more stacks. The cache entries in each particular stack may be ordered from most recently used to least recently used based on a logical time stamp indicating the time the information, e.g., data, associated with the cache entry was requested.

A workload is not static but dynamic and changes over time. As the workload changes, the cache may be reconfigured based on tracking the changes in the workload. If an item requested in the stream of new requests, i.e., changes in the request stream, is present in a particular cache entry, a "cache hit" is said to occur. When a cache hit occurs, the frequency count associated with the cache entry requested is updated, i.e., increased by one, in the cache directory associated with that cache entry. A determination may then be made as to whether the updated frequency count associated with that particular cache entry subsequently increases in number to the frequency count associated with the next higher level stack. If the updated frequency count associated with that particular cache entry subsequently increases in number to the frequency count associated with the next higher level stack, then that particular cache entry may be stored in a most recently used stack position in the next higher level stack. Upon storing the particular cache entry in the most recently used stack position in the next higher level stack, the next higher level stack subsequently expands in size by one entry. Upon moving the cache entry with an updated frequency count to the next higher level stack, the next lower level stack reduces in size by one entry.

If an item requested in the stream of new requests, i.e., changes in the request stream, is not present in a particular cache entry, a "cache miss" is said to occur. A cache array may be reconfigured when a cache miss occurs by tracking the number of cache hits in or more particular stack positions in each particular stack of the cache array during a particular duration of time. The one or more stack positions tracked in each stack may be located towards the end of each stack since the cache entries in these stack positions are least likely to incur a cache hit and hence most desirable to evict so as to provide an entry to store the requested information from a disk. The number of cache hits in each of the one or more stack positions tracked in each stack during a particular period of time may be counted. The number of cache hits counted in each of the one or more stack positions tracked in each stack during a particular period of time may be added. The total number of cache hits in the one or more stack positions tracked in each stack during a particular period of time may be compared with one another. The cache entry in the least recently used stack position in the stack with the lowest number of cache hits in the one or more stack positions tracked may be evicted thereby allowing a new entry to be inserted in the most recently used stack position in the lowest level stack to store the requested information. Subsequently, the stack with the lowest number of cache hits in the one or more stack positions tracked may be reduced in size by one entry and the stack storing the requested information may be increased in size by one entry.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 11 illustrates an embodiment of the present invention of tracking cache hits in one or more windows of a particular duration of time.

DETAILED DESCRIPTION

The present invention comprises a system, computer program product and method for reconfiguring a cache. In one embodiment of the present invention, a cache array may be created with one or more stacks of cache entries based on a workload. The one or more stacks in the cache array may be ordered in an array from most frequently used to least frequently used based on the frequency counts associated with the one or more stacks. The cache entries in each particular stack may be ordered from most recently used to least recently used based on a logical time stamp indicating the time the information, e.g., data, associated with the cache entry was requested. When a cache hit occurs, the frequency count associated with the cache entry requested is updated, i.e., increased by one, in the cache directory associated with that cache entry. If the updated frequency count associated with that particular cache entry subsequently increases in number to the frequency count associated with the next higher level stack, then that particular cache entry may be stored in a most recently used stack position in the next higher level stack. Upon storing the particular cache entry in the most recently used stack position in the next higher level stack, the next higher level stack subsequently expands in size by one entry. Upon moving the cache entry with an updated frequency count to the next higher level stack, the next lower level stack reduces in size by one entry. When a cache miss occurs, the cache entry in a least recently used stack position in the stack with the lowest number of cache hits in the one or more stack positions tracked during a particular period of time may be evicted thereby allowing a new entry to be inserted in the most recently used stack position in the lowest level stack to store the requested information. Subsequently, the stack with the lowest number of cache hits in the one or more stack positions tracked may be reduced in size by one entry and the stack storing the requested information may be increased in size by one entry. It is noted that even though the following discusses the present invention in connection with a disk cache, the present invention may be implemented in any type of cache including a memory cache and a filter cache.

Figure 1:
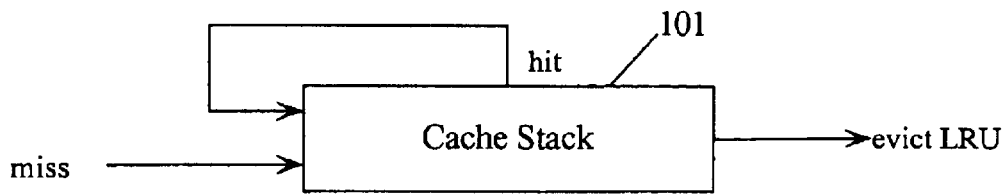
FIG. 1 illustrates an embodiment of the Least Recently Used replacement method for designing a cache.
Figure 2:
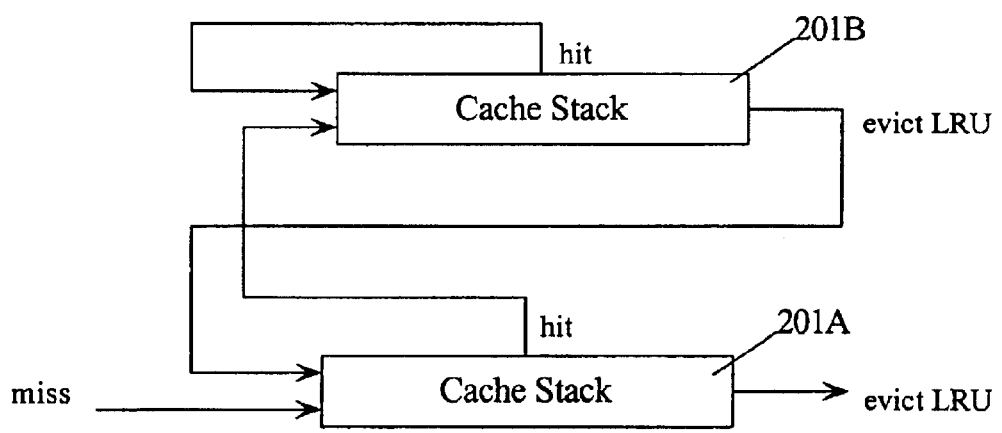
FIG. 2 illustrates an embodiment of the Segmented Least Recently Used replacement method for designing a cache.
Figure 3:
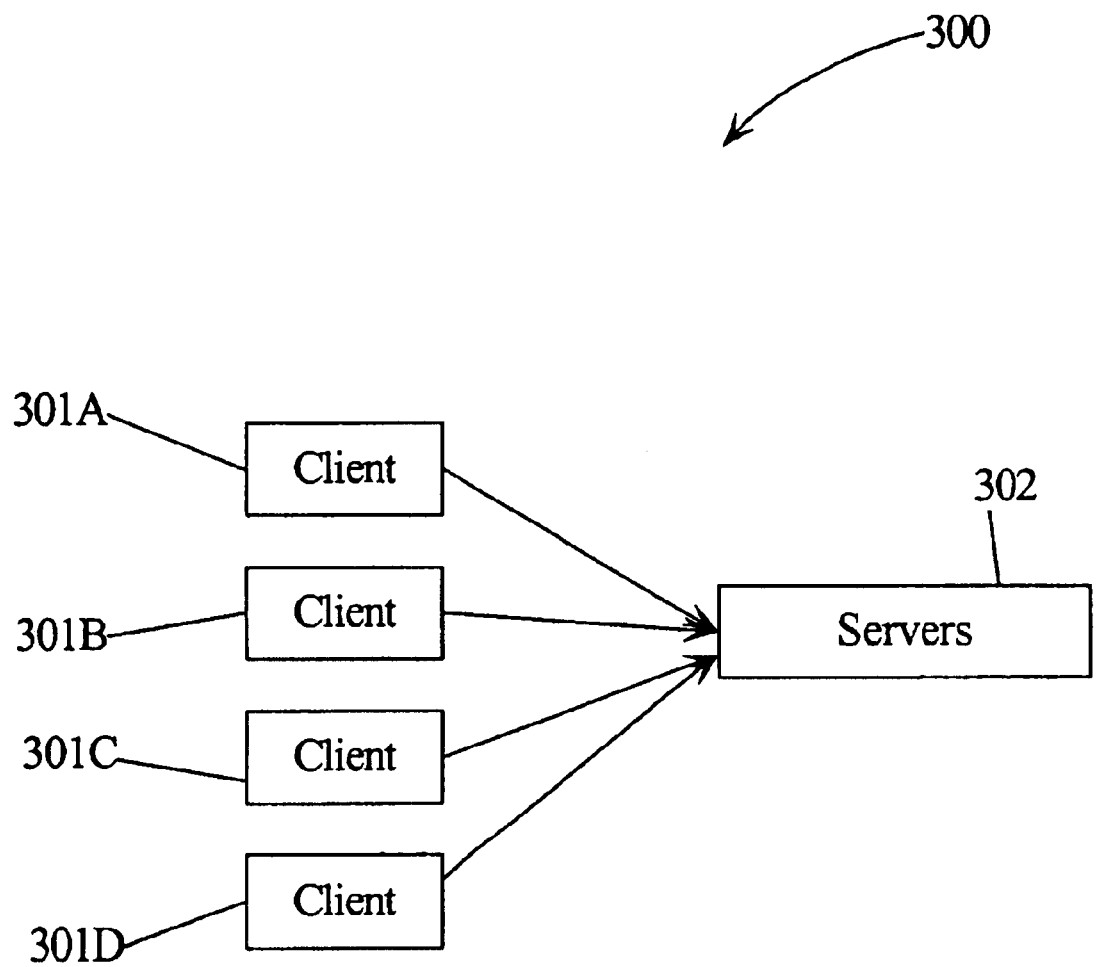
FIG. 3 illustrates an embodiment of a network system configured in accordance with the present invention.

FIG. 3—Network System

FIG. 3 illustrates one embodiment of the present invention of a network system 300. Network system 300 may comprise one or more clients 301A–D configured to send requests to a server 302, e.g., file server, database server, web server. Clients 301A–D may collectively or individually be referred to as clients 301 or client 301, respectively. It is noted that system 300 may comprise any number of clients 301 and that FIG. 3 is illustrative. It is further noted that network system 300 may be any type of system such as a file system or a database system and that FIG. 3 is not to be limited in scope to any one particular embodiment.

FIG. 4—Server

Figure 4:
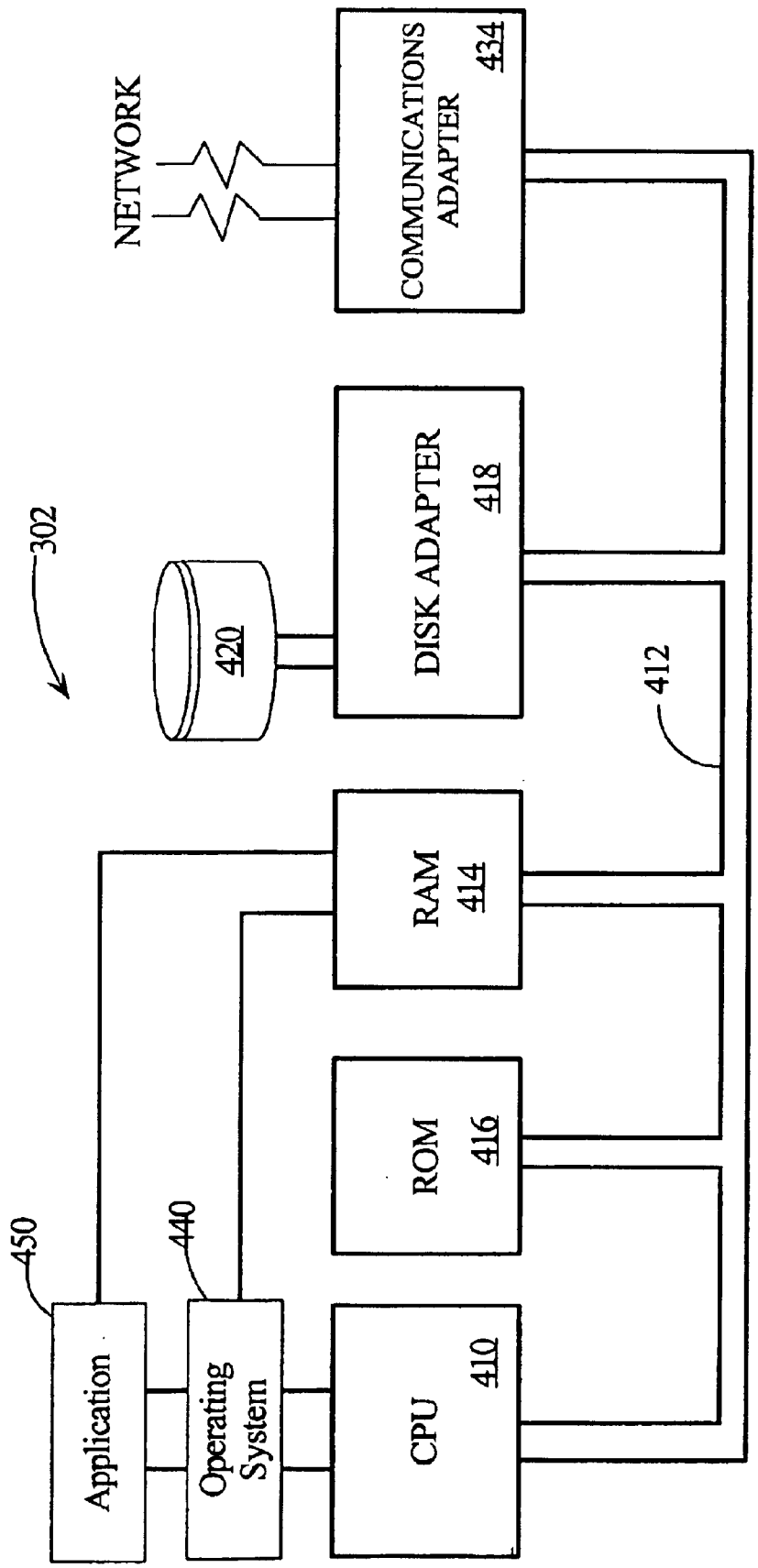
FIG. 4 illustrates an embodiment of the present invention of a server.

FIG. 4 illustrates an embodiment of the present invention of server 302. Referring to FIGS. 3 and 4, one or more clients 301 may issue requests to read from or write to a disk 420 in server 302. It is noted that the embodiment of the present invention is not limited to read and/or write requests but any requests that require service from server 302. As stated in the Background Information section, these stream of requests may form what is commonly referred to as a workload. That is, a workload may refer to the requests that need to be serviced by server 302. In one embodiment, the workload may be managed by a disk adapter 418. If these requests in the workload may be serviced by a disk cache (not shown) within disk adapter 418 instead of disk 420, then the instructions and data requested may be accessed faster. Therefore, it is desirable to optimize the disk cache (not shown) so that as many requests may be serviced by the disk cache as possible. It is noted that a disk cache may reside in other locations than disk adapter 418, e.g., disk unit 420, application 450. A method for designing a cache, e.g., disk cache, configured to adaptively reconfigure, e.g., length of the stacks in the cache may adapt to changes in the request stream, is described in the description of FIG. 5.

Referring to FIG. 4, server 302 may further comprise a central processing unit (CPU) 410 coupled to various other components by system bus 412. An operating system 440 runs on CPU 410 and provides control and coordinates the function of the various components of FIG. 4. Application 450, e.g., program for designing a cache, e.g., disk cache, configured to adaptively reconfigure, e.g., length of the stacks in the cache may adapt to changes in the request stream, as described in FIG. 5, runs in conjunction with operating system 440 which implements the various functions to be performed by application 450. Read only memory (ROM) 416 is coupled to system bus 412 and includes a basic input/output system ("BIOS") that controls certain basic functions of server 302. Random access memory (RAM) 414, disk adapter 418 and communications adapter 434 are also coupled to system bus 412. It should be noted that software components including operating system 440 and application 450 are loaded into RAM 414 which is the computer system's main memory. Disk adapter 418 may be a small computer system interface ("SCSI") adapter that communicates with disk units 420, e.g., disk drive. It is noted that the program of the present invention that designs a cache, e.g., disk cache, configured to adaptively reconfigure, e.g., length of the stacks in the cache may adapt to changes in the request stream, as described in FIG. 5 may reside in disk adapter 418, disk unit 420 or in application 450. Communications adapter 434 interconnects bus 412 with an outside network enabling server 302 to communicate with other such systems.

Implementations of the invention include implementations as a computer system programmed to execute the method or methods described herein, and as a computer program product. According to the computer system implementations, sets of instructions for executing the method or methods are resident in the random access memory 414 of one or more computer systems configured generally as described above. Until required by server 302, the set of instructions may be stored as a computer program product in another computer memory, for example, in disk drive 420 (which may include a removable memory such as an optical disk or floppy disk for eventual use in disk drive 420). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 5:
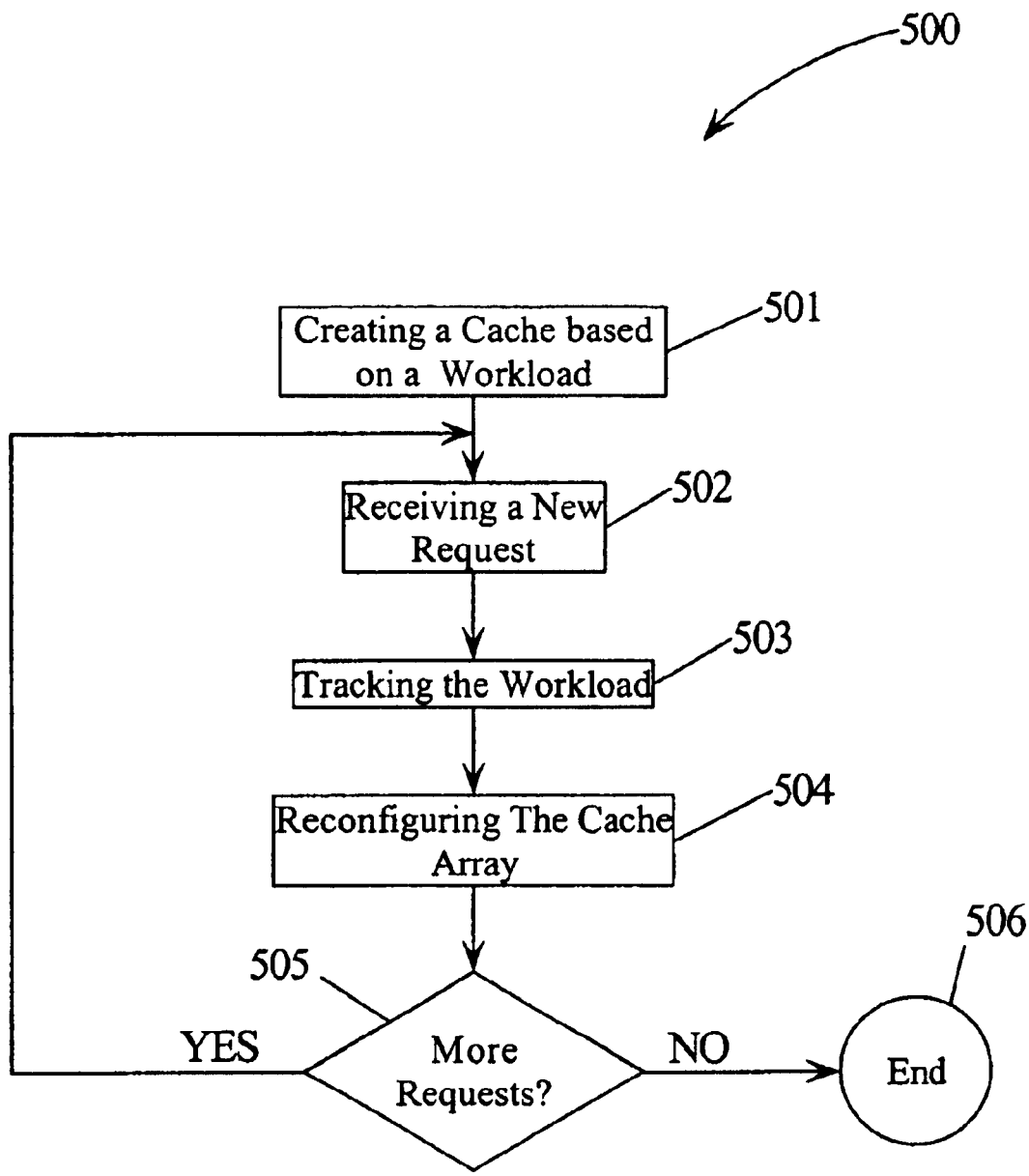
FIG. 5 is a flowchart of a method for designing a cache configured to adaptively reconfigure.

FIG. 5—Method for Designing a Cache Configured to Adaptively Reconfigure

FIG. 5 is a flowchart of one embodiment of the present invention of a method 500 for designing a cache configured to adaptively reconfigure. As stated in the Background Information section, prior art methods of designing caches focus on static techniques instead of adaptive techniques. For example, the length of the stacks in these caches do not adapt, i.e., change in size, to changes in the request stream. Consequently, these methods do not efficiently use memory space thereby improving the cache hit rate since the cache is not designed based on adaptive techniques. It would therefore be desirable to develop a cache configured to adaptively reconfigure thereby improving the performance of the cache, i.e., improving the cache hit rate. Method 500 is a method for designing a cache configured to adaptively reconfigure.

Figure 6:
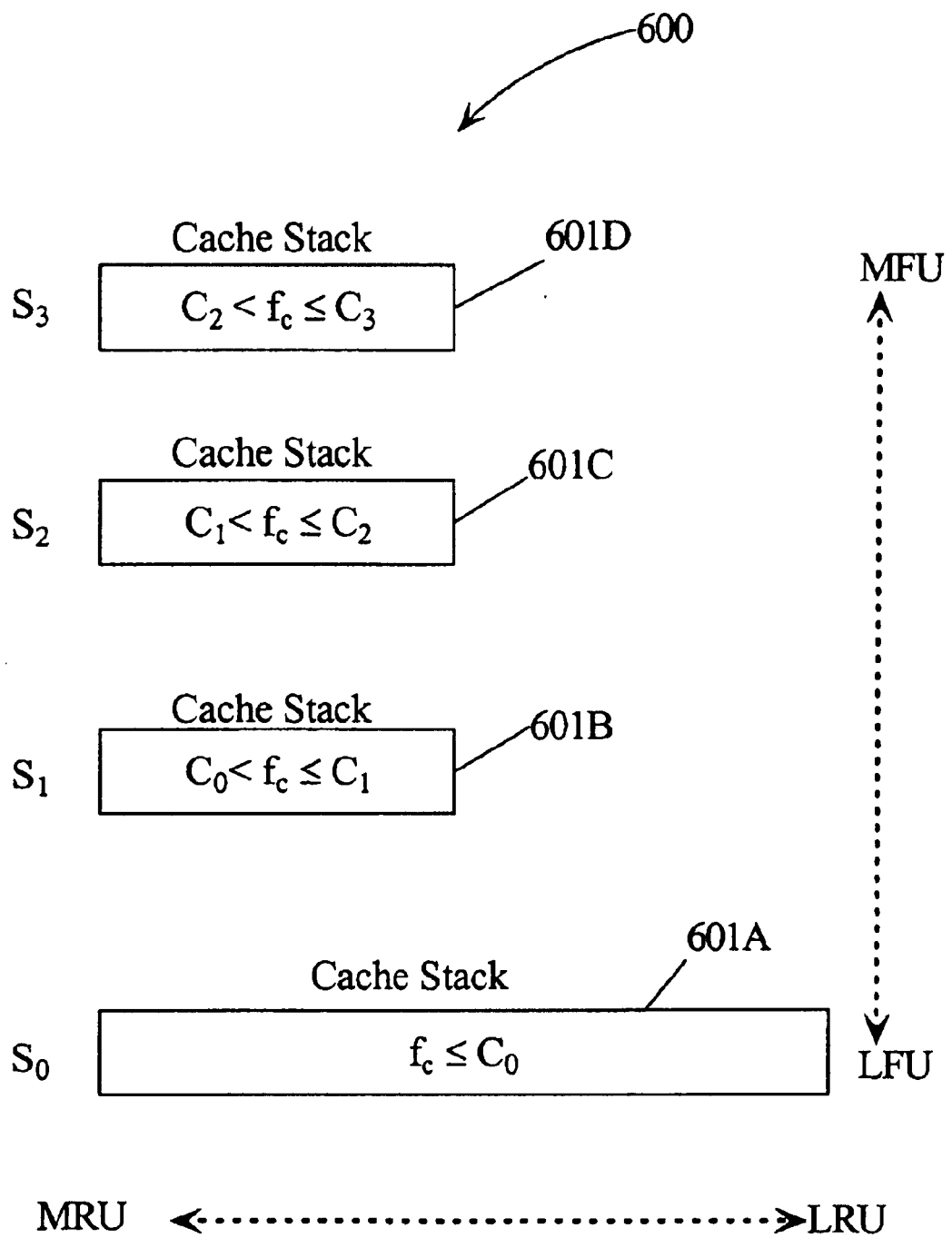
FIG. 6 illustrates an embodiment of a cache array created based on an analysis of a workload configured in accordance with the present invention.

In step 501, a cache, e.g., Least Recently Used (LRU)—Least Frequently Used (LFU) cache, may be created based on an analysis of a workload as described in U.S. patent application Ser. No. 09/838,607, entitled "Designing a Cache Using a Canonical LRU-LFU Array," which is hereby incorporated herein in its entirety by reference. The cache created may comprise one or more stacks where each stack comprises one or more cache entries as illustrated in FIG. 6. FIG. 6 illustrates an embodiment of the present invention of a cache array 600 created based on an analysis of a workload. Cache array 600 may comprise one or more stacks 601A–D. Stacks 601A–D may collectively or individually be referred to as stacks 601 or stack 601, respectively. Each stack 601 may comprise one or more cache entries. In the exemplary embodiment, cache array 600 comprises a total of 256 cache entries which are allocated across stacks 601A–D. For example, stack 601A may comprise 128 cache entries. Stack 601B may comprise 14 cache entries. Stack 601C may comprise 36 cache entries. Stack 601D may comprise 78 cache entries. It is noted that cache array 600 may comprise any number of stacks 601 and that each stack 601 may comprise any number of cache entries and that FIG. 6 is illustrative.

Figure 7:
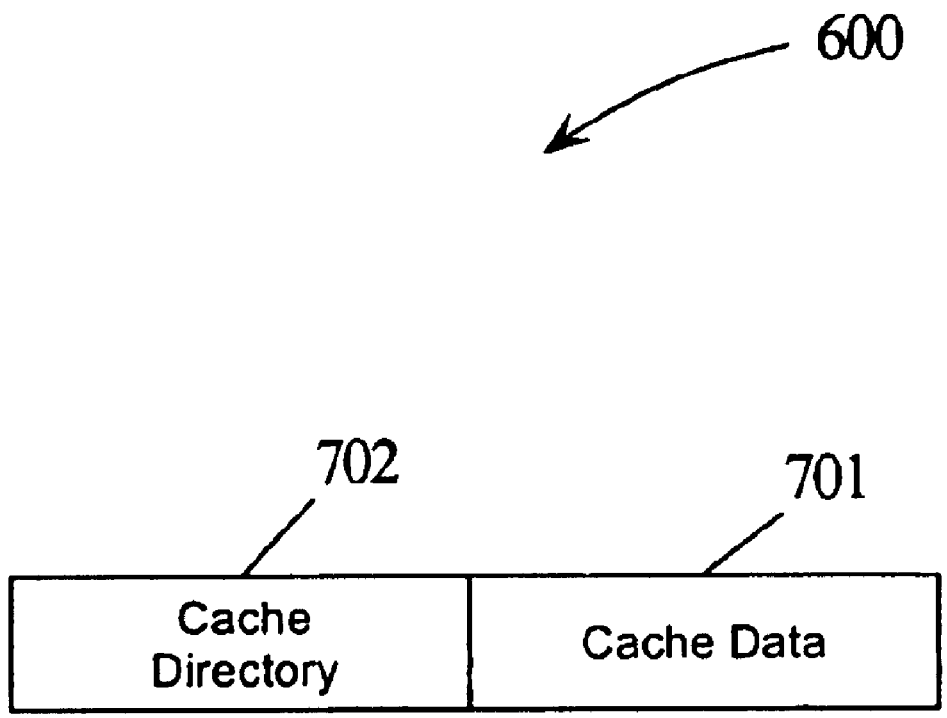
FIG. 7 illustrates an embodiment of a cache array comprising two logical portions configured in accordance with the present invention.

Cache array 600 may comprise two logical portions, e.g., data storage area, cache directory, as illustrated in FIG. 7. FIG. 7 illustrates an embodiment of the present invention of cache array 600 comprising two logical portions. It is noted that cache array 600 may comprise a different number of logical portions and that FIG. 7 is illustrative. Referring to FIG. 7, a first logical portion is a data storage area 701 where data storage area 701 comprises a set of cache entries where each cache entry stores particular instructions and data. A second logical portion is a cache directory 702 storing the logical base addresses associated with the cache entries in data storage area 701. Cache directory 702 may further be configured to store a logical time stamp associated with each cache entry in data storage area 701 indicating the time the information, e.g., data, in the associated cache entry was requested. Cache directory 702 may further be configured to store the frequency count associated with each cache entry in cache array 600 where the frequency count indicates the number of times the information, e.g., data, in the associated cache entry was requested. Cache directory 702 may further be configured to store the hit count associated with each stack position in each stack 601 in cache array 600 where the hit count indicates the number of times the information, e.g., data, in the associated stack position was requested.

Referring to FIG. 6, the cache entries may be stored in particular stacks 601 based on the frequency counts of the cache entries. For example, stack 601A may comprise cache entries that have a frequency count less than or equal to $C_0$. Stack 601B may comprise cache entries that have a frequency count less than or equal to $C_1$ and greater than $C_0$. Stack 601C may comprise cache entries that have a frequency count less than or equal to $C_2$ and greater than $C_1$. Stack 601D may comprise cache entries that have a frequency count less than or equal to $C_3$ and greater than $C_2$. In one embodiment, stacks 601A–D may be ordered from most frequently used to least frequently used based on the frequency counts associated with each stack 601. For example, stack 601A is located on the lowest level of the array since the frequency count, e.g., $C_0$, associated with stack 601A is lower than the frequency counts, e.g., $C_1$, $C_2$, $C_3$, associated with the other stacks 601, e.g., stack 601B–D. Stack 601D is located on the highest level of the array since the frequency count, e.g., $C_3$, associated with stack 601D is higher than the frequency counts, e.g., $C_0$, $C_1$, $C_2$, associated with the other stacks 601, e.g., stack 601A–C, in cache array 600.

Referring to FIG. 6, the cache entries in each particular stack 601, e.g., stacks 601A–D, may be ordered within stack 601 from most recently used to least recently used based on the logical time stamps of the cache entries. That is, the cache entry whose logical time stamp indicates the most recent time entry of all the cache entries in stack 601 is placed in the first stack position commonly referred to as the most recently used stack position in stack 601. The cache entry whose logical time stamp indicates the last time entry of all the cache entries in stack 601 is placed in the last stack position commonly referred to as the least recently used stack position in stack 601.

In step 502, server 302 may be configured to receive a new request from a particular client 301. The request may be a request to read from and/or write to disk 420 of server 302. It is further noted that the embodiment of the present invention is not limited to read and/or write requests but any requests that require service from server 302.

In step 503, the workload comprising a stream of requests including the new request may be tracked. As stated in the Background Information section, a workload is not static but dynamic and changes over time. Consequently, it may be desirable for cache array 600 to adapt to changes in the request stream. In step 504, cache array 600 may be reconfigured based on tracking the workload. Step 504 may comprise sub-steps as illustrated in FIG. 8.

Figure 8:
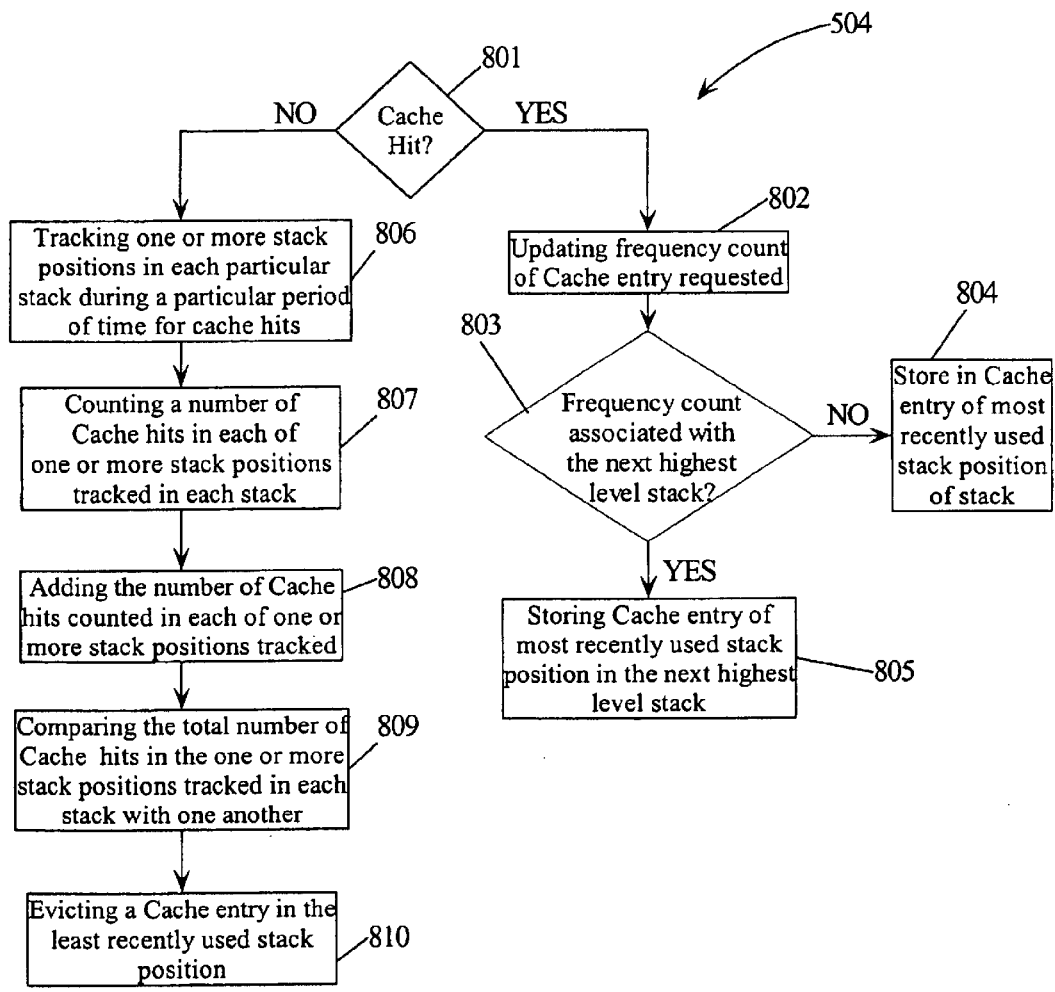
FIG. 8 is a flowchart of the sub-steps of the step of reconfiguring a cache array based on changes in the workload.

Referring to FIG. 8, a determination is made in step 801 as to whether the new request in the workload received in step 502 results in a cache hit. When an item, e.g., data, requested in the stream of new requests is present in a particular cache entry a "cache hit" is said to occur. It may be desirable for cache array 600 to adapt to changes in the request stream such as when a request results in a cache hit as illustrated in FIG. 9.

Figure 9:
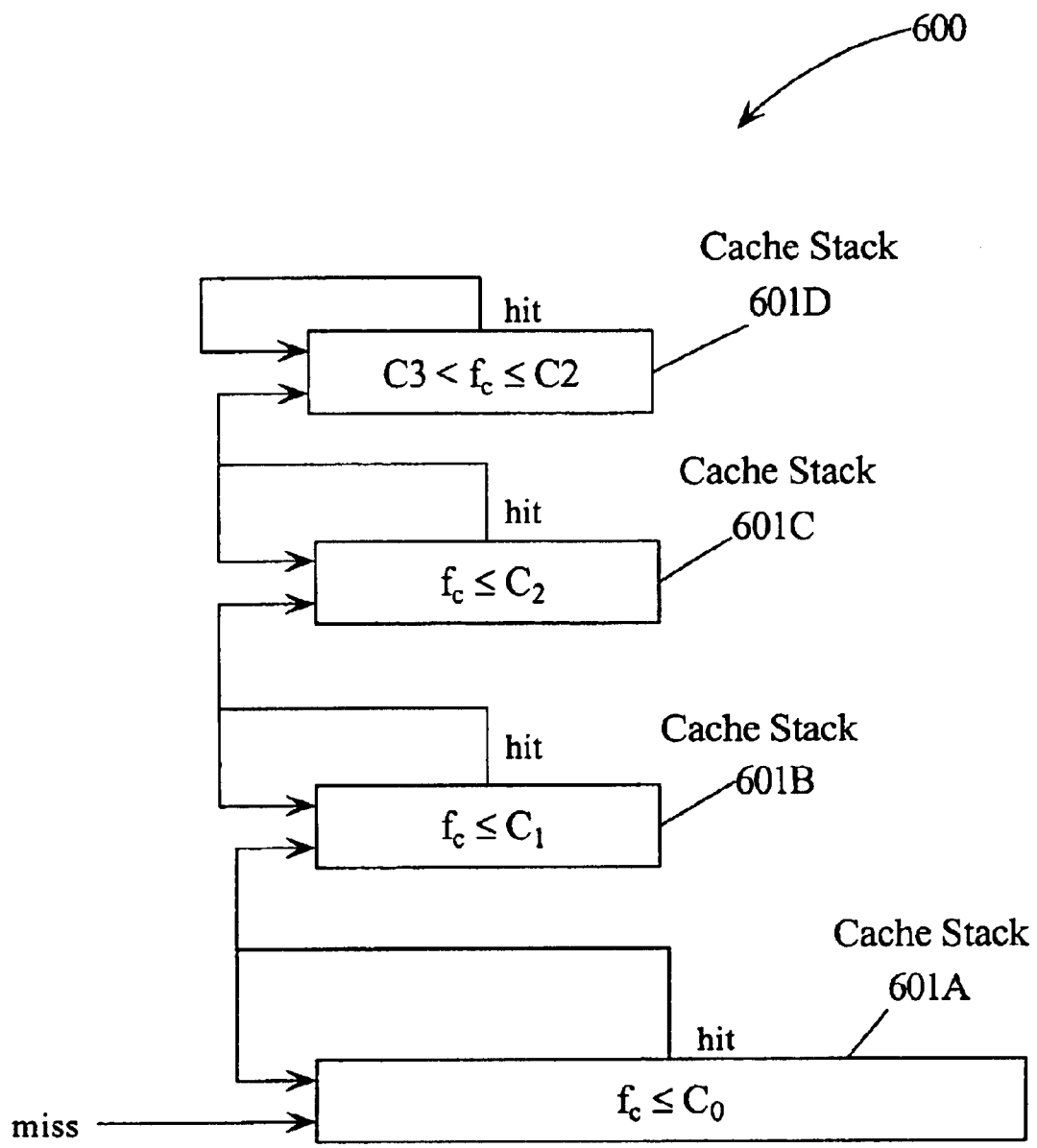
FIG. 9 illustrates an embodiment of the present invention of a cache array configured to adaptively reconfigure when a request in the request stream results in a cache hit.

FIG. 9 illustrates an embodiment of the present invention of cache array 600 configured to adaptively reconfigure when a request in the stream of new requests, i.e., changes in the request stream, results in a cache hit. Referring to FIGS. 8 and 9, when a cache hit occurs in a particular stack 601, e.g., stack 601A, the frequency count associated with that cache entry is updated, i.e., increased by one, in the cache directory in step 802. A determination is then made as to whether the updated frequency count associated with that particular cache entry subsequently increases in number to the frequency count, e.g., $C_1$, associated with the next higher level stack 601, e.g., stack 601B, in step 803. If the updated frequency count associated with that particular cache entry does not subsequently increase in number to the frequency count, e.g., $C_1$, associated with the next higher level stack 601, e.g., stack 601B, then that particular cache entry may be stored in the most recently used stack position in its stack 601, e.g., stack 601A, in step 804. If the updated frequency count associated with that particular cache entry subsequently increases in number to the frequency count, e.g., $C_1$, associated with the next higher level stack 601, e.g., stack 601B, then that particular cache entry may be stored in the most recently used stack position in the next higher level stack 601, e.g., stack 601B in step 805. Upon storing the particular cache entry in the most recently used stack position in the next higher level stack 601, e.g., stack 601B, the next higher level stack 601, e.g., stack 601B, subsequently expands in size by one entry. Upon moving the cache entry with an updated frequency count, e.g., $C_1$, associated with the next higher level stack 601, e.g., stack 601B, the next lower level stack 601, e.g., stack 601A, reduces in size by one entry. When a cache hit occurs in the highest level stack 601, e.g., stack 601D, in the array, the cache entry associated with the cache hit is stored at the most recently used stack position in that stack 601, e.g., stack 601D. It is noted that a stack 601 may be reduced in size to zero and therefore the number of stacks 601 in cache array 600 may be reduced. For example, if stack 601B were reduced in size to zero, then cache array 600 would comprise stacks 601A, 601C and 601D only. It is further noted that cache array 600 may initially comprise only one stack 601 and expand into a plurality of stacks 601. It is further noted that cache array 600 may initially comprise a plurality of stacks 601 and reduce to one stack 601.

Referring to step 801 in FIG. 8, if an item, e.g., data, requested in the stream of new requests is not present in a particular cache entry a "cache miss" is said to occur. When a cache miss occurs, the requested item, e.g., information, data, may be retrieved from disk 420 and then stored in the most recently used stack position of the lowest level stack, e.g., stack 601A, as illustrated in FIG. 9. When a new entry is inserted in stack 601A, a cache entry in a least recently used stack position in one of the stacks 601 of cache array 600 may be evicted. The method of selecting which cache entry in one of the stacks 601 to be evicted is described in steps 806–809.

In step 806, cache array 600 may be reconfigured when a cache miss occurs by tracking the number of cache hits in one or more particular stack positions in each particular stack 601 of cache array 600 during a particular duration of time. In one embodiment, the number of cache hits are tracked in the one or more stack positions located towards the end of each stack 601 since the cache entries in these stack positions are least likely to incur a cache hit and hence most desirable to evict so as to provide an entry to store the requested information form disk 420. For example, the last four stack positions in each particular stack 601 of cache array 600 may be tracked for cache hits as illustrated in FIG. 10.

Figure 10:
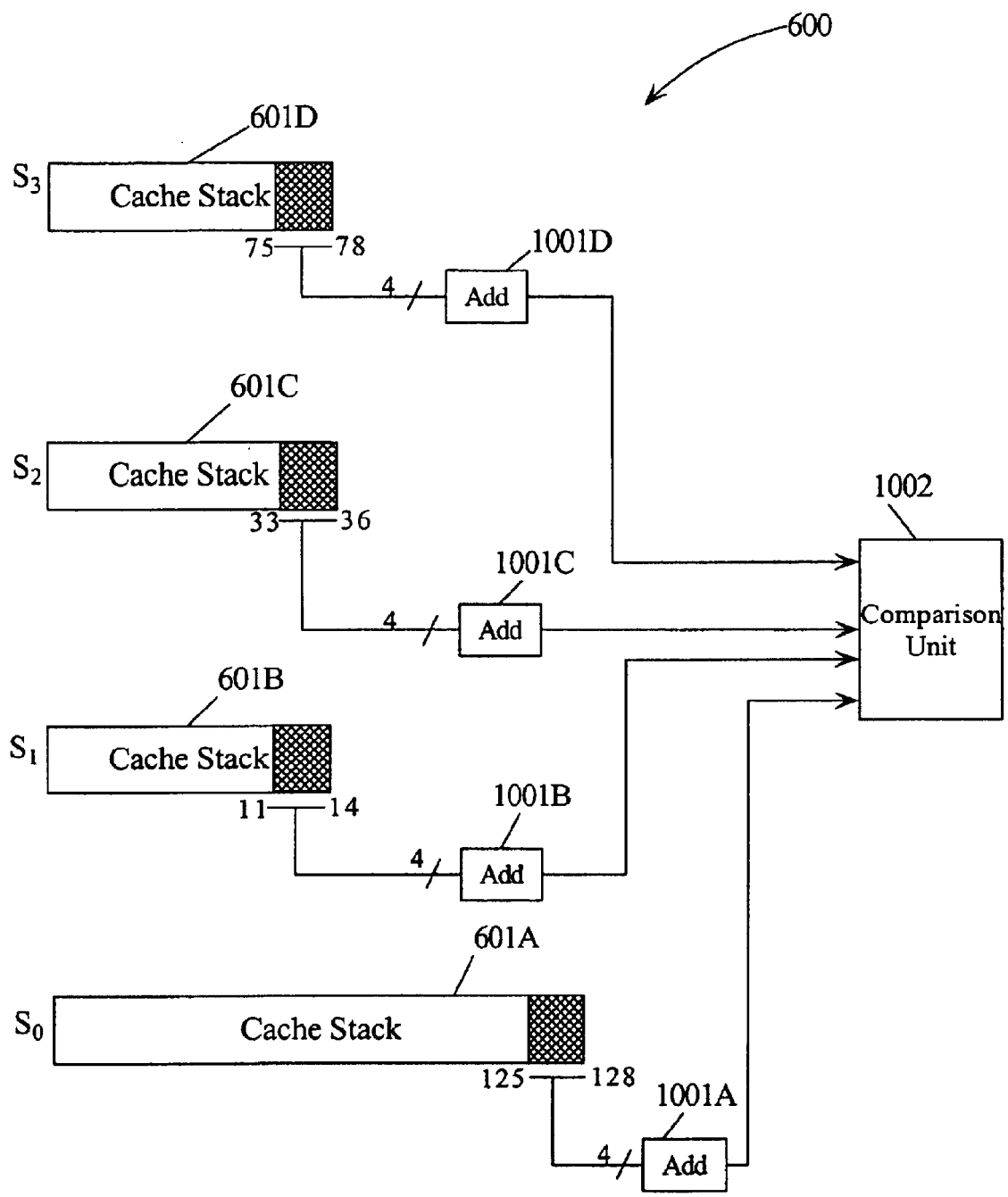
FIG. 10 illustrates an embodiment of the present invention of a cache array configured to adaptively reconfigure when a request in the request stream results in a cache miss.

FIG. 10 comprises an embodiment of the present invention of a cache array 600 with additional units, e.g., adders 1001A–1001D, comparison unit 1002, configured to adaptively reconfigure cache 600 when a cache miss occurs. Referring to FIG. 10, stack positions 125–128 in stack 601A may be tracked. Stack positions 11–14 in stack 601B may be tracked. Stack positions 33–36 in stack 601C may be tracked. Stack positions 75–78 in stack 601D may be tracked. It is noted that any particular stack position in each particular stack may be tracked. However, the number of stack positions tracked in each particular stack 601 should be the same. A more detailed explanation of FIG. 10 is provided further below.

As stated above, the one or more stack positions in each particular stack 601, e.g., stacks 601A–D, of cache 600 may be tracked for cache hits during a particular duration of time. In one embodiment, the cache hits may be tracked for each particular stack 601, e.g., stacks 601-D, of cache 600 in one or more windows of a particular duration of time, e.g., time $t_n$ to $t_{n-4}$, as illustrated in FIG. 11. FIG. 11 illustrates an embodiment of the present invention of tracking cache hits in one or more windows of a particular duration of time. It is noted that the windows may vary in duration of time and that FIG. 11 is illustrative. FIG. 11 illustrates that the duration of time from time $t_n$ to $t_{n-4}$ may comprise four windows, e.g., window n, window n–1, window n–2, window n–3. During each window, the number of cache hits in one or more particular stack positions in each particular stack 601, e.g., stacks 601A–D, may be tracked. For example, during the first window, e.g., window n, two cache hits occurred in the one or more stack positions tracked in stack 601A as indicated by the two "A's" under window n. One cache hit occurred in the one or more stack positions tracked in stack 601B during the first window, e.g., window n, as indicated by the "B" under window n. One cache hit occurred in the one or more stack positions tracked in stack 601C during the first window, e.g., window n, as indicated by the "C" under window n. Two cache hits occurred in the one or more stack positions tracked in stack 601D during the first window, e.g., window n, as indicated by the "D's" under window n. The other cache hits are similarly indicated in the other windows, e.g., window n–1, window n–2, window n–3, of a particular duration of time. The particular time a cache hit occurs may be based on a logical time stamp that marks the arrival of the particular request in the request stream. That is, a logical time stamp may mark the arrival of a request that results in a cache hit.

In one embodiment, the cache hits in each window, e.g., window, may be assigned a particular weight based on the recency of the cache hit. That is, the more current requests in the request stream may be assigned a greater weight than the requests issued further back in time. For example, the cache hits may be assigned a weight of 0.4 for those occurring in window n, a weight of 0.3 for those occurring in window n–1, a weight of 0.2 for those occurring in window n–2 and a weight of 0.1 for those occurring in window n–3.

Referring to FIG. 8, in step 807, the number of cache hits in each of the one or more stack positions tracked in each particular stack 601 during a particular period of time may be counted. In one embodiment, the number of cache hits in each stack position in each stack 601 may be counted by a particular counter associated with that particular stack position. Each counter associated with a particular stack position may be implemented in software. For example, disk unit 420 or application 450 may comprise software configured to generate a particular counter associated with a particular stack position.

Referring to FIGS. 8 and 10, in step 808, the number of cache hits counted in each of the one or more stack positions tracked in each particular stack 601 of cache array 600 may be added as illustrated in FIG. 10. As stated above, FIG. 10 comprises an embodiment of the present invention of a cache array 600 with additional units, e.g., adders 1001A–1001D, comparison unit 1002, configured to adaptively reconfigure cache 600 when a cache miss occurs. Cache array 600 comprises stacks 601A–D where the number of cache hits counted in the one or more stack positions, e.g., last four positions, tracked during a particular period of time in each particular stack 601 may be added by adders 1001A–1001D. Adders 1001A–1001D may collectively or individually be referred to as adders 1001 or adder 1001, respectively. The output of adders 1001 is inputted to a comparison unit 1002 configured to determine which stack 601 had the highest hit count in the one or more stack positions tracked and which stack 601 had the lowest hit count in the one or more stack positions tracked during a particular period of time as explained in greater detail below. It is noted that the stacks 601 of cache array 600 may be coupled to a different number of adders 1001 corresponding to a different number of stacks 601 in cache array 600 and that FIG. 10 is illustrative.

As stated above, one or more stack positions, e.g., last four stack positions, in each particular stack 601 may be tracked for cache hits during a particular period of time in step 806. The number of cache hits occurring in the one or more cache entries tracked in step 806 during a particular period of time in each particular stack 601 may be counted in step 807. The number of cache hits counted in the one or more cache entries tracked in each particular stack 601 may be added in step 808 using adders 1001A–D. For example, referring to FIGS. 10 and 11, the number of cache hits occurring in stack positions 125–128 in stack 601A was seven from time $t_n$ to $t_{n-4}$. The number of cache hits occurring in stack positions 11–14 in stack 601B was four from time $t_n$ to $t_{n-4}$. The number of cache hits occurring in stack positions 33–36 in stack 601C was three from time $t_n$ to $t_{n-4}$. The number of cache hits occurring in stack positions 75–78 in stack 601D was five from time $t_n$ to $t_{n-4}$.

In one embodiment, the number of cache hits counted in step 807 and added in step 808 may be adjusted according to a weight assigned to the one or more windows of the period of time, e.g., $t_n$ to $t_{n-4}$, used to track the one or more stack positions in stacks 601. For example, referring to FIGS. 10 and 11, the cache hits may be assigned a weight of 0.4 for those occurring in window n, a weight of 0.3 for those occurring in window n–1, a weight of 0.2 for those occurring in window n–2 and a weight of 0.1 for those occurring in window n–3. Subsequently, the number of cache hits occurring in stack positions 125–128 in stack 601A is 1.9 from time $t_n$ to $t_{n-4}$. The number of cache hits occurring in stack positions 11–14 in stack 601B is 1 from time $t_n$ to $t_{n-4}$. The number of cache hits occurring in stack positions 33–36 in stack 601C is 0.8 from time $t_n$ to $t_{n-4}$. The number of cache hits occurring in stack positions 75–78 in stack 601D is 1.3 from time $t_n$ to $t_{n-4}$.

Referring to FIGS. 8 and 10, in step 809, the total number of cache hits in the one or more stack positions, e.g., four stack positions, tracked in each stack 601 during a particular period of time may be compared with one another by comparison unit 902. Upon comparing the total number of cache hits in the one or more stack positions, e.g., four stack positions, tracked in each stack 601 with one another, a cache entry may be evicted in one of the stacks 601 of cache array 600 thereby allowing cache array 600 to store the requested information in a cache miss in step 809 as described in greater detail below. In one embodiment, the stack 601 with the lowest number of hit counts in the one or more stack positions tracked may be reduced in size by one entry by comparison unit 902 evicting the cache entry in the least recently used stack position in that stack 601. As stated above, when a new request in the request stream requests an item, e.g., data, not found in cache array 600 a "cache miss" is said to occur. When a cache miss occurs, the requested item may be retrieved from disk 420 and then stored in the most recently used stack position in the lowest level stack 601, e.g., stack 601A. However, cache array 600 may have a fixed number of cache entries, e.g., 256. Subsequently, in order to store a new entry, a cache entry must be evicted from one of the stacks 601 in cache array 600. It may be desirable to evict the cache entry that is least important thereby being able to insert a new entry to store the requested information. The cache entry that is least important may be indicated by a low number of hit counts. Subsequently, the least recently used stack position in the stack 601 with the lowest number of hit counts in the one or more stack positions tracked may be evicted. For example, the information, e.g., data, in the cache entry in the least recently used stack position may be discarded. A new entry may then be inserted in the most recently used stack position in the lowest level stack 601, e.g., stack 601A, to store the requested information from disk 420.

For example, referring to FIGS. 10 and 11, stack 601C has the lowest hit count number in the one or more stack positions tracked during a particular period of time. Subsequently, comparison unit 902 may reduce the size of stack 601C by one entry by evicting the cache entry in the least recently used stack position. Stack 601C may then be reconfigured to have a length of 35 cache entries instead of 36 cache entries. A new entry may then be inserted in the most recently used stack position in the lowest level stack 601, e.g., stack 601A, to store the requested information from disk 420. Stack 601A would then be reconfigured to have a length of 129 cache entries instead of 128 cache entries.

It is noted that it is possible that two or more stacks 601 may have the lowest number of hit counts. Comparison unit 902 may be configured to evict the least recently used stack position in the stack 601 associated with the lowest frequency count. It is further noted that if cache array 600 has only one stack 601 then the cache entry at the least recently used stack position in the one stack 601 would be evicted to make room for the new entry inserted in the most recently used stack position in the one stack 601 to store the requested information from disk 420 in a cache miss. It is further noted that a stack 601 may be reduced in size to zero and therefore the number of stacks 601 in cache array 600 may be reduced. For example, if stack 601B were reduced in size to zero, then cache array 600 would comprise stacks 601A, 601C and 601D only.

In another embodiment, the stack 601, e.g., stack 601C, with the lowest number of hit counts in the one or more stack positions tracked may be reduced in size by one entry and the stack 601, e.g., stack 601A, with the highest number of hit counts in the one or more stack positions tracked may be increased in size by one entry by comparison unit 902. The stack 601, e.g., stack 601C, with the lowest number of hit counts in the one or more stack positions tracked may be reduced in size by one entry by comparison unit 902 evicting the cache entry in least recently used stack position. An entry may then be added to the stack 601, e.g., stack 601A, with the highest number of hit counts in the one or more stack positions tracked by comparison unit 902 which may store the information, e.g., data, requested in a cache miss or information in a cache entry evicted.

Referring to FIG. 5, in step 505, a determination may be made as to whether there are more new requests, e.g., request to read from and/or write to disk 420 of server 302, to be received by server 302. If there are more new requests, then server 302 receives the new request in step 502. If there are no more new requests, then method 500 is terminated in step 506.

It is noted that method 500 may be executed in a different order presented and that the order presented in the discussion of FIGS. 5 and 8 is illustrative. It is further noted that certain steps may be executed almost concurrently.

Although the system, computer program product and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for reconfiguring a cache comprising the steps of:
   creating a cache with one or more stacks of cache entries;
   receiving a new request;
   tracking a workload comprising a stream of requests including said new request; and
   reconfiguring said cache based on said tracking of said workload;
   wherein said step of reconfiguring comprises a step of:
      determining whether said new request in said workload resulted in a cache hit or a cache miss;
      wherein if said cache hit occurred then the method further comprises the step of:
         updating a frequency count associated with a cache entry requested in a first stack.

2. The method as recited in claim 1 further comprising the step of:
   determining whether said updated frequency count increases in number to a frequency count associated with a next higher level stack.

3. The method as recited in claim 2, wherein if said updated frequency count increases in number to said frequency count associated with said next higher level stack, then said cache entry associated with said updated frequency is stored in a most recently used stack position in said next higher level stack, wherein said first stack is reduced in size by one entry.

4. The method as recited in claim 2, wherein if said updated frequency count does not increase in number to said frequency count associated with said next higher level stack, then said cache entry associated with said updated frequency is stored in a most recently used stack position in said first stack.

5. The method as recited in claim 1, wherein said stream of requests forming said workload are requests to access a disk.

6. A method for reconfiguring a cache comprising the steps of:
   creating a cache with one or more stacks of cache entries;
   receiving a new request;
   tracking a workload comprising a stream of requests including said new request; and reconfiguring said cache based on said tracking of said workload;
wherein said step of reconfiguring comprises a step of:
determining whether said new request in said workload resulted in a cache hit or a cache miss;
wherein if said cache miss occurred then the method further comprises the step of:
tracking one or more stack positions in each particular stack of said one or more stacks during a particular period of time for cache hits.

7. The method as recited in claim 6 further comprising the step of:
counting a number of said cache hits in each of said one or more stack positions tracked in each particular stack of said one or more stacks during said particular period of time.

8. The method as recited in claim 7 further comprising the step of:
adding said number of said cache hits counted in each of said one or more stack positions tracked in each particular stack of said one or more stacks during said particular period of time.

9. The method as recited in claim 8, wherein said particular period of time is comprised of one or more windows of time.

10. The method as recited in claim 9, wherein each of said one or more windows of said particular period of time is assigned a particular weight.

11. The method as recited in claim 10, wherein said number of cache hits in said one or more stack positions tracked in each particular stack of said one or more stacks during said particular period of time is adjusted according to said weight assigned for each of said one or more windows of time.

12. The method as recited in claim 8 further comprising the step of:
comparing said number of cache hits in said one or more stack positions tracked in each particular stack of said one or more stacks with one another.

13. The method as recited in claim 12, wherein a first stack of said one or more stacks associated with a lowest number of hit counts in said one or more stack positions tracked is decreased in size by one entry.

14. The method as recited in claim 13, wherein said first stack of said one or more stacks associated with said lowest number of hit counts in said one or more stack positions tracked is decreased in size by evicting a cache entry in a least recently used stack position in said first stack.

15. The method as recited in claim 14, wherein one of said one or more stacks is increased in size by one entry to store information associated with a cache miss, wherein said information associated with said cache miss is stored in a most recently used stack position in said one of said one or more stacks.

16. The method as recited in claim 15, wherein said one of said one or more stacks is a lowest level stack of said one or more stacks.

17. A computer program product embodied in a machine readable medium for reconfiguring a cache comprising the programming steps of:
creating a cache with one or more stacks of cache entries;
receiving a new request;
tracking said workload comprising a stream of requests including said new request; and
reconfiguring said cache based on said tracking of said workload;
wherein said reconfiguring said cache comprises the programming step of:
determining whether said new request in said workload resulted in a cache hit or a cache miss;
wherein if said cache hit occurred then the computer program product further comprises the programming step of:
updating a frequency count associated with a cache entry requested in a first stack.

18. The computer program product as recited in claim 17 further comprises the programming step of:
determining whether said updated frequency count increases in number to a frequency count associated with a next higher level stack.

19. The computer program product as recited in claim 18, wherein if said updated frequency count increases in number to said frequency count associated with said next higher level stack, then said cache entry associated with said updated frequency is stored in a most recently used stack position in said next higher level stack, wherein said first stack is reduced in size by one entry.

20. The computer program product as recited in claim 18, wherein if said updated frequency count does not increase in number to said frequency count associated with said next higher level stack, then said cache entry associated with said updated frequency is stored in a most recently used stack position in said first stack.

21. The computer program product as recited in claim 17, wherein said stream of requests forming said workload are requests to access a disk.

22. A computer program product embodied in a machine readable medium for reconfiguring a cache comprising the programming steps of:
creating a cache with one or more stacks of cache entries;
receiving a new request;
tracking said workload comprising a stream of requests including said new request; and
reconfiguring said cache based on said tracking of said workload;
wherein said reconfiguring said cache comprises the programming step of:
determining whether said new request in said workload resulted in a cache hit or a cache miss;
wherein if said cache miss occurred then the computer program product further comprises the programming step of:
tracking one or more stack positions in each particular stack of said one or more stacks during a particular period of time for cache hits.

23. The computer program product as recited in claim 22 further comprises the programming step of:
counting a number of said cache hits in each of said one or more stack positions tracked in each particular stack of said one or more stacks during said particular period of time.

24. The computer program product as recited in claim 23 further comprises the programming step of:
adding said number of said cache hits counted in each of said one or more stack positions tracked in each particular stack of said one or more stacks during said particular period of time.

25. The computer program product as recited in claim 24, wherein said particular period of time is comprised of one or more windows of time.

26. The computer program product as recited in claim 25, wherein each of said one or more windows of said particular period of time is assigned a particular weight.

27. The computer program product as recited in claim 26, wherein said number of cache hits in said one or more stack positions tracked in each particular stack of said one or more stacks during said particular period of time is adjusted according to said weight assigned for each of said one or more windows of time.

28. The computer program product as recited in claim 24 further comprises the programming step of:
comparing said number of cache hits in said one or more stack positions tracked in each particular stack of said one or more stacks with one another.

29. The computer program product as recited in claim 28, wherein a first stack of said one or more stacks associated with a lowest number of hit counts in said one or more stack positions tracked is decreased in size by one entry.

30. The computer program product as recited in claim 29, wherein said first stack of said one or more stacks associated with said lowest number of hit counts in said one or more stack positions tracked is decreased in size by evicting a cache entry in a least recently used stack position in said first stack.

31. The computer program product as recited in claim 30, wherein one of said one or more stacks is increased in size by one entry to store information associated with a cache miss, wherein said information associated with said cache miss is stored in a most recently used stack position in said one of said one or more stacks.

32. The computer program product as recited in claim 31, wherein said one of said one or more stacks is a lowest level stack of said one or more stacks.

33. A system comprising:
a processor;
a memory unit operable for storing a computer program for reconfiguring a cache; and
a bus system coupling the processor to the memory, wherein said processor, responsive to said computer program, comprises:
circuitry operable for creating a cache with one or more stacks of cache entries;
circuitry operable for receiving a new requests;
circuitry operable for tracking said workload comprising a stream of requests including said new request; and
circuitry operable for reconfiguring said cache based on said tracking of said workload;
wherein said circuitry operable for reconfiguring comprises:
circuitry operable for determining whether said new request in said workload resulted in a cache hit or a cache miss;
wherein if said cache hit occurred then said processor further comprises:
circuitry operable for updating a frequency count associated with a cache entry requested in a first stack.

34. The system as recited in claim 33, wherein said processor further comprises:
circuitry operable for determining whether said updated frequency count increases in number to a frequency count associated with a next higher level stack.

35. The system as recited in claim 34, wherein if said updated frequency count increases in number to said frequency count associated with said next higher level stack, then said cache entry associated with said updated frequency is stored in a most recently used stack position in said next higher level stack, wherein said first stack is reduced in size by one entry.

36. The system as recited in claim 34, wherein if said updated frequency count does not increase in number to said frequency count associated with said next higher level stack, then said cache entry associated with said updated frequency is stored in a most recently used stack position in said first stack.

37. The system as recited in claim 33, wherein said stream of requests forming said workload are requests to access a disk.

38. A system comprising:
a processor;
a memory unit operable for storing a computer program for reconfiguring a cache; and
a bus system coupling the processor to the memory, wherein said processor, responsive to said computer program, comprises:
circuitry operable for creating a cache with one or more stacks of cache entries;
circuitry operable for receiving a new requests;
circuitry operable for tracking said workload comprising a stream of requests including said new request; and
circuitry operable for reconfiguring said cache based on said tracking of said workload;
wherein said circuitry operable for reconfiguring comprises:
circuitry operable for determining whether said new request in said workload resulted in a cache hit or a cache miss;
wherein if said cache miss occurred then said processor further comprises:
circuitry operable for tracking one or more stack positions in each particular stack of said one or more stacks during a particular period of time for cache hits.

39. The system as recited in claim 38, wherein said processor further comprises:
circuitry operable for counting a number of said cache hits in each of said one or more stack positions tracked in each particular stack of said one or more stacks during said particular period of time.

40. The system as recited in claim 39, wherein said processor further comprises:
circuitry operable for adding said number of said cache hits counted in each of said one or more stack positions tracked in each particular stack of said one or more stacks during said particular period of time.

41. The system as recited in claim 40, wherein said particular period of time is comprised of one or more windows of time.

42. The system as recited in claim 41, wherein each of said one or more windows of said particular period of time is assigned a particular weight.

43. The system as recited in claim 42, wherein said number of cache hits in said one or more stack positions tracked in each particular stack of said one or more stacks during said particular period of time is adjusted according to said weight assigned for each of said one or more windows of time.

44. The system as recited in claim 40, wherein said processor further comprises:
circuitry operable for comparing said number of cache hits in said one or more stack positions tracked in each particular stack of said one or more stacks with one another.

45. The system as recited in claim 39, wherein a first stack of said one or more stacks associated with a lowest number of hit counts is decreased in size by one entry.

46. The system as recited in claim 45, wherein said first stack of said one or more stacks associated with said lowest number of hit counts in said one or more stack positions tracked is decreased in size by evicting a cache entry in a least recently used stack position in said first stack.

47. The system as recited in claim 46, wherein one of said one or more stacks is increased in size by one entry to store information associated with a cache miss, wherein said information associated with said cache miss is stored in a most recently used stack position in said one of said one or more stacks.

48. The system as recited in claim 47, wherein said one of said one or more stacks is a lowest level stack of said one or more stacks.

* * * * *